United States Patent [19]

Knutson et al.

[11] Patent Number: 4,759,983
[45] Date of Patent: Jul. 26, 1988

[54] PRESSURE SENSITIVE ADHESIVES AND ADHESIVE ARTICLES

[75] Inventors: Gaylen M. Knutson, Yorba Linda; Paul J. Steinwand, Placentia; Joseph J. Wilczynski, Yorba Linda; Lonnie T. Spada, Walnut, all of Calif.

[73] Assignee: Union Oil Company of California, Los Angeles, Calif.

[21] Appl. No.: 869,044

[22] Filed: May 30, 1986

[51] Int. Cl.$^4$ .................. C09J 7/02; B32B 27/06; B32B 27/32
[52] U.S. Cl. .................... 428/343; 428/349; 428/355; 428/913; 526/316
[58] Field of Search ............... 428/343, 347, 349, 355, 428/913; 525/328.6, 300; 524/357, 381; 560/178; 106/288 Q; 430/627, 336; 526/316

[56] References Cited

U.S. PATENT DOCUMENTS

| | | | |
|---|---|---|---|
| 3,345,336 | 10/1967 | Kuhlkamp et al. | 525/328.6 |
| 3,459,790 | 8/1969 | Smith | 560/178 |
| 3,488,708 | 1/1970 | Smith | 430/336 |
| 3,544,987 | 1/1971 | Smith | 430/627 |
| 3,607,834 | 9/1971 | Marx et al. | 524/357 |
| 3,658,878 | 4/1972 | Smith | 430/627 |
| 4,408,018 | 10/1983 | Bartman | 525/300 |
| 4,421,887 | 12/1983 | Braun et al. | 524/381 |

FOREIGN PATENT DOCUMENTS

| | | | |
|---|---|---|---|
| 1144486 | 3/1969 | United Kingdom | 525/300 |
| 1541909 | 3/1979 | United Kingdom | 106/288 Q |

OTHER PUBLICATIONS

D. A. Upson, "Journal of Polymer Science: Polymer Symposium", John Wiley & Sons, Inc. 1985, 72 (pp. 45–54).

Primary Examiner—Thomas J. Herbert
Attorney, Agent, or Firm—Michael H. Laird; D. Sandford; G. Wirzbicki

[57] ABSTRACT

Normally tacky, pressure sensitive adhesive compositions comprise one or more polymers containing pendant functional groups attached to a polymer backbone and having the formula:

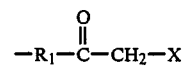

in which $R_1$ is a divalent organic radical at least 3 atoms in length, and X is organoacyl or cyano, and wherein said polymer is selected from the group consisting of (1) conjugated diolefin polymers comprising at least about 30 weight percent of one or more conjugated diene monomers having 4 to about 8 carbon atoms and 0 to about 70 weight percent of one or more alkenyl-substituted monoaromatic monomers, (2) olefin ester interpolymers comprising at least about 1 weight percent of a monoolefin monomer having up to about 4 carbon atoms and at least about 40 weight percent of an alkenyl or alkenol ester of a saturated carboxylic acid, (3) olefinically unsaturated carboxylic acid ester polymers comprising at least about 40 weight percent polymerized olefinically unsaturated carboxylic acid ester monomers, (4) alkenyl ether polymers comprising at least about 30 weight percent alkenyl ether monomer units, and (5) combinations thereof.

Such polymers have improved cohesive strength with little or no detriment to adhesive tack or adhesion, and these improvements are realized without the necessity of incorporating crosslinking monomers such as N-methylolamides or other crosslinking agents. Pressure sensitive adhesive, water-based emulsions, hot melts and solutions containing such polymers and adhesive articles having at least a portion of one surface thereof coated with such adhesives are also provided.

37 Claims, No Drawings

PRESSURE SENSITIVE ADHESIVES AND ADHESIVE ARTICLES

BACKGROUND

1. Field of the Invention

This invention relates to the field of pressure sensitive adhesives and to articles comprising such adhesives.

2. Introduction

Normally tacky, pressure sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources. Maintaining the requisite balance of such properties while improving one or more characteristics of such pressure sensitive adhesives is both difficult and unpredictable. Any modification of adhesive compositions which improves one adhesive property may detrimentally affect one or more other desirable properties. For instance, it is difficult to improve an adhesive's shear strength without reducing one or more other desirable properties.

Homopolymers and interpolymers of a variety of monomers are useful as pressure sensitive adhesives when applied to a backing as solutions, dispersions (emulsions) and/or hot melts. However, many PSA applications require shear strength values higher than those that can be provided by otherwise useful polymers. Some applications require shear strength values of at least about 50 minutes and higher, i.e. on the order of 500 to 10,000 minutes (determined by the shear value test described hereinafter). While there are various ways of improving PSA shear strength, many if not all of these detrimentally affect one or more other desirable properties. Polymer molecular weight can be increased to improve shear strength, but this route generally reduces tack and adhesion. Polar monomers, such as polymerizable carboxylic acids, often increase cohesive strength but also may result in low adhesion and tack. Cross-linking monomers, such as the N-methylol amides, or other crosslinking agents are generally expensive and they may reduce tack and adhesion. Their use also may reduce processability and may impair other properties such as clarity, color stability and UV stability.

The suitability of pressure sensitive adhesive compositions is also influenced by the ease of manufacture of both the adhesive and of articles containing the adhesive and by environmental and personnel safety hazards. For instance, PSAs are often applied to a backing as hot melts, polymer solutions or as dispersions of a polymer in an aqueous medium. Such solutions and dispersions must possess properties which facilitate their use in the manufacture of PSA-containing articles. Thus, the melt, solution or dispersion, as well as the polymer per se, must adequately wet the backing to assure adequate adhesive distribution, coverage and bonding to the backing.

The chemical composition of the PSA polymer carriers (when used) is also significant for several reasons. Solvents other than water are becoming more and more undesirable due to solvent expense and the cost and hazards involved in controlling solvent vapors. Yet such solvents are often necessary for adequate distribution and handling of polymers that cannot be employed effectively in water-based systems. Thus, water-based polymer latexes are much preferred in the adhesive manufacturing industry provided that the necessary physical and chemical properties of the finished article can be achieved. However, substitution of water-based latexes or hot melts for solvent-based polymers may reduce one or more physical properties.

N-methylol amide functional groups and other crosslinking monomers and agents are known to improve adhesive performance in several respects. However, such polymers release formaldehyde upon curing or can result in the presence of potentially toxic residues in the finished article. In particular, N-methylol amide-containing polymers release formaldehyde when cured, and they can result in formaldehyde residues in the finished product. Such formaldehyde release and residues are often undesirable since formaldehyde is coming under ever increasing scrutiny in both the workplace and home. It is particularly undesirable in medical and personal contact applications, such as adhesive bandages, and the state and federal Occupational Health and Safety Administrations (OSHA) have set stringent formaldehyde exposure limits for industrial workers.

Various rheological properties of water-base latexes are particularly important with regard to the suitability of such latexes for adhesive article manufacture. Latex particle size and particle size distribution can significantly influence latex physical properties which affect application of the latex to a backing. Similarly, latex viscosity can limit latex utility in adhesive article manufacture due to the influence of viscosity on adhesive distribution, filler loading (of the latex) and wetting of the adhesive article backing.

Yet further demands are placed on the chemical composition and physical properties of low temperature pressure sensitive adhesives, i.e., adhesives intended for use at relatively low temperatures. Often, PSAs which have adequate cohesive and adhesive strength at low temperatures are so "gummy" at ambient conditions that they complicate both adhesive handling at ambient temperatures and the manufacture of adhesive-containing articles. Such gummy adhesives also tend to "creep" and to "bleedthrough" labels and other backings.

Thus, it can be seen that the physical and chemical properties desired in adhesive compositions and articles, and in the polymer solutions, dispersions and melts employed in the manufacture of adhesive articles, place various, sometimes conflicting, demands on polymer composition and on the polymer carrier, i.e, solvent or water, if used. It is desirable to obtain a polymer system, preferably a water-base or hot melt system, which possesses a balance of properties suitable for the manufacture of pressure sensitive adhesives and PSA-containing articles.

SUMMARY OF THE INVENTION

It has now been found that pressure sensitive adhesives, and articles containing pressure sensitive adhesives, having an improved balance of PSA properties and, in particular, having improved shear holding value and acceptable adhesive strength and tack, can be obtained by employing, as a component of the adhesive, a polymer having a $T_g$ of about 0° C. or less containing pendant functional groups of the formula:

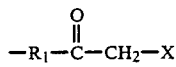

$$-R_1-\overset{\overset{\displaystyle O}{\|}}{C}-CH_2-X \quad (1)$$

wherein $R_1$ is a divalent organic radical at least 3 atoms in length, and X is organoacyl or cyano. Functional groups containing different $R_1$ and X radicals can be contained in the same polymer molecule, or polymers containing different $R_1$ and X groups can be blended in the same solution or dispersion. The polymers can be manufactured and applied to backings either as solutions, aqueous dispersions or hot melts, although aqueous dispersions and melts are particularly preferred since they eliminate the costs and hazards associated with solvents other than water. Such pressure sensitive adhesives and adhesive articles have an improved balance of properties. In particular, they possess improved cohesive strength without significant, if any, loss of adhesion or tack. They are relatively clear, colorless materials (unless intentionally colored by the addition of colorants), and they possess adequate color stability and resistance to sunlight and other ultraviolet sources. They do not require the use of crosslinking agents and catalysts, such as N-methylol amide monomers, although they may contain one or more of such materials. The low $T_g$ polymers which are useful as low temperature pressure sensitive adhesives, e.g. adhesives intended for use at about 10° C. or less, have adequate cohesive and adhesive strength at low temperatures yet are not excessively gummy at ambient temperatures.

DETAILED DESCRIPTION OF THE INVENTION

Normally tacky and pressure sensitive adhesive compositions are provided which comprise a polymer containing pendant functional groups of the formula:

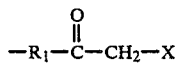

$$-R_1-\overset{\overset{\displaystyle O}{\|}}{C}-CH_2-X \quad (1)$$

wherein $R_1$ is a divalent organic radical at least 3 atoms in length, and X is organoacyl or cyano, and wherein the remainder of the polymer is selected from (1) conjugated diolefin polymers comprising at least about 50 weight percent of one or more conjugated diene monomers having 4 to about 8 carbon atoms and 0 to about 50 weight percent of one or more alkenyl-substituted monoaromatic monomers, (2) olefin ester interpolymers comprising at least about 1 weight percent of a monoolefin monomer having up to about 4 carbon atoms and at least about 40 weight percent of an alkenyl or alkenol ester of a saturated carboxylic acid, (3) olefinically unsaturated carboxylic acid ester polymers comprising at least about 40 weight percent polymerized olefinically unsaturated carboxylic acid ester monomers, (4) alkenyl ether polymers containing at least about 30 weight percent alkenyl ether monomer units, and (5) combinations thereof. Functional groups containing different $R_1$ and X radicals can be contained in the same polymer molecule, or polymers containing different $R_1$ and X groups can be blended in the same solution or dispersion. It is essential only that the useful polymers (1) contain functional groups containing either two carbonyl groups or a carbonyl and a cyano group separated by a single methylene group, as illustrated, and (2) the methylene group is separated from the polymer main chain (backbone) by at least 4 atoms ($R_1$ plus the "interior" carbonyl group). Thus, $R_1$ is at least 3 atoms in length; i.e., the shortest link between the interior carbonyl group and the polymer backbone is at least 3 atoms long. Otherwise, the molecular weight, structure and elemental composition of $R_1$ does not negate the effectiveness of the dual keto or keto-cyano functionality of the pendant side chains. Thus, $R_1$ can be of any molecular weight sufficient to allow incorporation of the pendant functional groups into the polymer backbone, for instance, as part of a polymerizable olefinically unsaturated monomer or by substitution onto a preferred polymer by any suitable reaction, e.g.:

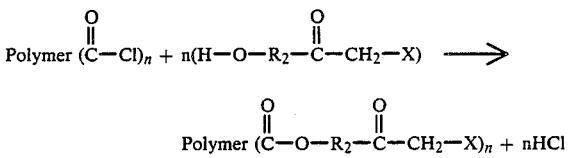

$$\text{Polymer }(\overset{\overset{\displaystyle O}{\|}}{C}-Cl)_n + n(H-O-R_2-\overset{\overset{\displaystyle O}{\|}}{C}-CH_2-X) \longrightarrow$$

$$\text{Polymer }(\overset{\overset{\displaystyle O}{\|}}{C}-O-R_2-\overset{\overset{\displaystyle O}{\|}}{C}-CH_2-X)_n + nHCl$$

where n is an integer, and $-O-R_2$ is $R_1$ in expression (1), supra. $R_1$ can contain heteroatoms, such as oxygen, sulfur, phosphorus, and nitrogen, functional groups such as carbonyl, carboxy-ester, thio, and amino substituents, and can comprise aromatic, olefinic or alkynyl unsaturation. Typically, $R_1$ will be a cyclic or acyclic divalent organic radical of 3 to about 40 atoms in length; i.e., having 3 to about 40 atoms in its shortest chain between the polymer backbone and the interior carbonyl group. For ease of manufacture from readily available reactants, $R_1$ is preferably of the formula:

$$-\overset{\overset{\displaystyle O}{\|}}{C}-Y-R_3-Z- \quad (2)$$

wherein Y and Z are independently selected from O, S, and $NR_7$, and $R_3$ is a divalent organic radical at least 1 atom in length, preferably 2 to about 40, and most preferably 2 to about 20 atoms in length. Y and Z are preferably O, and $R_7$ is H or a monovalent organic radical, preferably H or hydrocarbyl radical having up to 6 carbon atoms.

X in expression (1) is $-CO-R_4$ or $-CN$, preferably $-CO-R_4$ where $R_4$ is hydrogen or a monovalent organic radical preferably having up to 10 atoms other than hydrogen (i.e., up to 10 atoms not counting hydrogen atoms which may be present in the radical). Most preferably, $R_4$ is selected from substituted and unsubstituted alkylene, polyoxyalkylene, polythioalkylene and polyaminoalkylene radicals, typically up to about 40 atoms in length, preferably up to about 20 atoms in length. The substituted and unsubstituted polythio-, polyoxy-, and polyaminoalkylenes can be readily formed by the well known condensation of alkylene oxides, alkylene amines, glycols, diamines, and dithiols. Thus:

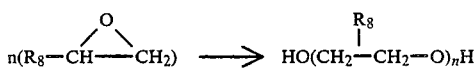

$$n(R_8-\overset{\overset{\displaystyle O}{\diagup\phantom{x}\diagdown}}{CH-CH_2}) \longrightarrow HO(CH_2-\overset{\overset{\displaystyle R_8}{|}}{CH_2}-O)_nH$$

where $R_8$ is H or a monovalent organic radical, preferably H or alkyl radical. To illustrate, such pendant functional groups (formula 1) can be introduced into the polymer backbone by copolymerization of other monomers (discussed hereinafter) with a polymerizable monomer of the formula:

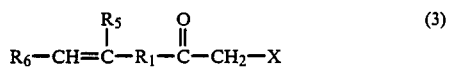

wherein X and $R_1$ are as defined for formula 1, supra, $R_6$ and $R_5$ are independently selected from hydrogen hydroxy, halo, thio, amino, and monovalent organic radicals, preferably having up to 10 atoms other than hydrogen, most preferably alkyl radicals having up to 10 carbons atoms. Substituting the preferred form of the group $R_1$ illustrated in formula 2 for $R_1$ in formula 1 yields the most preferred functional monomers:

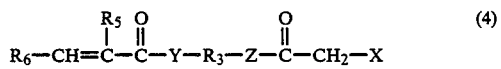

where $R_3$, $R_5$, $R_6$, X, Y and Z have the definitions given above. From this expression it can be seen that when $R_6$ is hydrogen, X is —CO—$R_4$, $R_4$ and $R_5$ are methyl, Y and Z are O, and $R_3$ is an ethylene radical, the resulting monomer is acetoacetoxyethyl methacrylate, one of the class of monomers described by Smith in U.S. Pat. No. 3,554,987, the disclosure of which is incorporated herein by reference in its entirety. This monomer can be prepared by first treating ethylene glycol with methacrylic acid to form hydroxyethyl methacrylate which then is treated with diketene, as described by Smith, to form acetoacetoxyethyl methacrylate. A particularly preferred class of functional monomers, due to their relative availability, are those disclosed by Smith, which correspond to formula (4) in which $R_6$ is hydrogen, Y and Z are oxygen, $R_5$ is hydrogen or an alkyl group having up to 12 carbon atoms, $R_3$ is an alkylene group containing up to 10 carbon atoms, X is —CO—$R_4$, and $R_4$ is an alkyl group having up to 8 carbon atoms.

The useful pressure sensitive adhesive polymers contain a sufficient amount of one or more of the described functional monomers to increase cohesive strength of the adhesive relative to an otherwise identical pressure sensitive adhesive in the absence of such functional monomers. Detectable enhancement of cohesive strength is found in many polymers at functional monomer concentrations as low as 0.05 weight percent. Generally, however, the useful polymers will contain at least about 0.1 and typically at least about 0.25 weight percent of the functional monomer based on total polymer weight. Much higher functional monomer concentrations can be employed. Thus, functional monomer concentrations will usually be between about 0.1 to about 20 weight percent or more, typically about 0.1 to about 10 weight percent. Surprisingly, very significant increases in cohesive strength can be achieved at functional monomer concentrations below 5 weight percent and even below 2 weight percent. Hence, preferred functional monomer concentrations in many of the useful pressure sensitive adhesives will be within the range of about 0.1 to about 5 weight percent, often within the range of about 0.1 to about 2 weight percent.

Presently preferred polymers which contain the above described functional monomers include (1) copolymers of substituted or unsubstituted alkenyl aromatic monomers and conjugated diolefins, (2) olefin ester interpolymers of $C_{2-4}$ monoolefins and $C_{2-8}$ alkenyl or alkenol esters of $C_{1-2}$ saturated carboxylic acids, (3) polymerized alkyl and alkanol esters of olefinically unsaturated carboxylic acids, (4) alkenyl ether homopolymers and interpolymers of $C_{2-10}$ olefin ethers of $C_{1-10}$ alcohols, and (5) combinations thereof. In addition to the above described functional monomers, each of these preferred classes of polymers can contain additional monomers such as olefinically unsaturated mono- and polycarboxylic acids, amides, aldehydes, etc.

Illustrative polymers of esters of olefinically unsaturated carboxylic acids are described by Spada and Wilczynski in copending application Ser. No. 859,057 filed May 2, 1986 for PRESSURE SENSITIVE ADHESIVES AND MANUFACTURED ARTICLES and by Midgley in U.S. Pat. No. 4,540,739 (1985), the disclosures of which are incorporated herein by reference in their entireties. These polymers comprise, primarily, one or more polymerized, olefinically unsaturated mono- and/or polycarboxylic acid esters, and optionally may contain other polymerized monomers. Thus, the ester polymers usually contain at least about 40 weight percent, often at least about 60 weight percent, and preferably at least about 80 weight percent polymerized, olefinically unsaturated carboxylic acid ester monomers other than the above described functional monomers. Presently preferred ester monomers are esters of olefinically unsaturated mono- and polycarboxylic acids having 4–17 carbon atoms, and hydroxy-, amino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic, itaconic, etc. Illustrative hydroxy-, amino-, and thio-substituted alcohols, amines, and thiols are glycerol, 1-hydroxy-5-thiododecane, 2-amino-5-hydroxyhexane, etc. Presently preferred esters, due primarily to cost and availability, are hydroxy-substituted and unsubstituted alcohol esters of acrylic and methacrylic acids such as butyl acrylate, 2-ethylhexyl acrylate, methyl methacrylate, hydroxyethyl acrylate, etc.

A variety of olefinically unsaturated carboxylic acid ester monomers, as well as a variety of other polymerizable olefinically unsaturated monomers useful for the manufacture of pressure sensitive adhesive polymers, and the interrelationship of these monomers to polymer Tg (glass transition temperature) are discussed in the Handbook of Pressure-Sensitive Adhesive Technology, Van Nostrand-Reinhold Company, New York, 1982 particularly at pages 298 through 329, including the references cited therein, the disclosures of which are incorporated herein by reference in their entireties. The principal characteristic of pressure sensitive adhesives based on such carboxylic acid ester homo- or interpolymers is the low glass transition temperature (Tg) which can be achieved, in some instances, with carboxylic acid ester homopolymers but is usually obtained by polymerizing "hard" ester monomers with suitable proportions of "soft" ester monomers to form a polymer having the Tg best suited to the particular application. So called "hard" monomers are those which produce homopolymers having relatively high $T_g$s, while "soft" monomers are those which form homopolymers having relatively low $T_g$s. For instance, acrylate monomers are typically "softer" than the corresponding methacrylic acid esters. Thus, polyethyl acrylate has a $T_g$ of $-22°$ C. while polyethyl methacrylate has a $T_g$ of $65°$ C. The $T_g$ of poly-n-butyl acrylate is $-54°$ C. as compared to a $T_g$ of 20° C. for poly-n-butyl methacrylate. n-butyl acrylate, 2-ethylhexyl acrylate and n-octyl acrylate are commonly employed "soft" monomers while various methacrylates, including methyl, isopropyl, n-butyl, and t-butyl methacrylate, are typical "hard" monomers.

The $T_g$ of any homopolymer can be readily determined, and the $T_g$ of an interpolymer of two or more such monomers can be predicted, roughly, from the respective $T_g$s of each of the monomers involved. The most exact method of determining the glass transition temperature of the selected interpolymer of any combination of monomers is, of course, measurement of the $T_g$ of that interpolymer per se. The homo- and interpolymers useful in the pressure sensitive adhesives of this invention typically have $T_g$s of about 0° C. or less, preferably about −10° C. or less. Polymers having lower $T_g$s are particularly preferred for use as low temperature pressure sensitive adhesives which generally have $T_g$s on the order of about −40° C. or less. Thus, the useful polymers will generally have $T_g$s within the range of about −80° to about 0° C., preferably about −60° to about −10° C.

The described functional monomers and olefinically unsaturated carboxylic acid ester monomers can constitute the total composition of this polymer class, or the portion of the polymer molecule not accounted for by those two monomer classes can be any polymerizable, olefinically unsaturated monomer or combination of such monomers. Illustrative of other polymerizable monomers are vinyl esters of carboxylic acids, the acid moiety of which contains from 1 to about 20 carbon atoms (e.g., vinyl acetate, vinyl propionate, vinyl isononanoate); aromatic or aliphatic, alpha-beta-unsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having up to 10 carbon atoms such as acrylic, methacrylic, crotonic, itaconic, and fumaric acids, and the like.

The conjugated diolefin polymers typically contain about 0.5 to about 50 weight percent of one or more vinyl aromatic monomers and about 50 to about 99 weight percent of one or more conjugated diolefins having 4 to about 8 carbon atoms. These copolymers may be either random or block interpolymers. Illustrative alkenyl aromatic monomers include styrene, alpha-methylstyrene, p-methylstyrene, chlorostyrene, methylbromostyrene, etc. Illustrative conjugated diolefin monomers include butadiene, isoprene, etc. The alkenyl aromatic monomer is preferably present at a concentration of about 5 to about 70 weight percent, most preferably about 20 to about 50 weight percent, while the conjugated diolefin monomer is typically present at a concentration of about 30 to about 95 weight percent, most preferably about 50 to about 80 weight percent.

As in the case of the olefinically unsaturated carboxylic acid ester polymers discussed above, the conjugated diolefin polymers can contain various other monomers, in addition to the above described functional monomers, such as the vinyl esters of carboxylic acids, mono-olefins, olefinically unsaturated nitriles, olefinically unsaturated carboxylic acids, etc., discussed above with regard to the olefinically unsaturated carboxylic acid ester interpolymers. Furthermore, the conjugated diolefin polymers can contain up to about 40 weight percent, typically up to about 20 weight percent, of olefinically unsaturated carboxylic acid ester monomer units such as those described above for use in production of the useful carboxylic acid ester interpolymers.

The olefin ester polymers typically contain about 1 to about 40 weight percent of a $C_{2-4}$ monoolefin monomer, from about 60 to about 99.5 weight percent of a $C_{2-8}$ alkenyl or alkenol ester of a $C_{1-12}$ saturated carboxylic acid and about 0.5 to about 10 weight percent of a functional monomer as described above. Preferably, the monoolefin monomer is present in an amount from about 1 to 25 weight percent, most preferably from about 10 to 15 weight percent. Illustrative mono-olefins are ethylene, propylene and butylene, with ethylene being preferred.

The ester component of the olefin ester polymers is preferably a $C_{2-8}$ alkenyl or alkenol ester of a $C_{1-12}$ saturated carboxylic acid. Illustrative $C_{2-8}$ unsaturated alcohols and diols which can be reacted with $C_{1-12}$ saturated carboxylic acids to form reactive esters are $C_{2-8}$ alkenols such as propenol, butenol, pentenol, hexenol, heptenol and octenol and their diol homologues. Suitable saturated acids include formic, acetic, propionic, butanoic, valeric, caproic, heptanoic and octenoic acids. The most common of the foregoing esters are vinyl acetate, vinyl propioniate, and vinyl butanoate.

The alkenyl ether polymers typically contain at least about 30 weight percent, preferably at least about 50 weight percent, polymerized alkenyl ether monomer units in which the alkenyl group has at least 2 carbon atoms, typically 2 to about 10 carbon atoms, and the alcohol (hydrocarbyl-oxy) group has from 1 to about 10 carbon atoms. Illustrative are methylvinyl ether, n-octyl-1-propenyl ether, 2,4-dimethylbutyl-2-hexenyl ether, vinylphenyl ether, etc.

The polymers encompassed by the four general classes described above can contain minor amounts, e.g. up to 30 weight percent, of one or more additional monomers, and they can be grafted or reacted with other chemical agents to modify their chemical composition. Thus, the polymers of groups (1) and (3) may contain minor amounts of substituted and unsubstituted monoolefin monomers such as ethylene, isobutylene, chlorobutenes, acrylonitrile, vinyl ethers, alkenyl esters of saturated carboxylic acids, etc. The conjugated diolefin polymers (group 1) may also contain olefinically unsaturated carboxylic acid ester monomers, and the olefinically unsaturated acid ester polymers (group 3) may contain conjugated diolefin and/or alkenyl monoaromatic monomers. Similarly, the alkenyl ester polymers of group (2) and the alkenyl ether polymers of group (4) can contain substituted and/or unsubstituted conjugated diolefins, alkenyl aromatics, olefinically unsaturated carboxylic acid esters, etc.

It has been found that minor amounts of olefinically unsaturated mono- and polybasic carboxylic acids and/or sulfoalkyl esters of such carboxylic acids significantly improve cohesive strength of the PSA polymers. Thus, it is presently preferred that the polymers contain at least about 0.1 weight percent, usually about 0.1 to about 10 weight percent, and preferably about 0.1 to about 5 weight percent of a polymerizable, olefinically unsaturated carboxylic acid having up to about 10 carbon atoms and/or a sulfoalkyl esters of such acids, e.g. sulfoethyl methacrylate, sulfoethyl itaconate, sulfomethyl malonate, etc.

Although the polymers can contain other "functional" monomers such as N-methylol amides, e.g., N-methylol acrylamide, it has been found that such other functional monomers are not essential to achieving acceptable adhesive properties and that the detriment associated with the presence of such monomers, such as formaldehyde release upon curing, loss of tack and adhesion, etc., can be avoided by minimizing the concentration of such N-methylol amides or eliminating them altogether. Thus, the preferred polymers contain less than about 1 percent, preferably less than about 0.5 percent, and most preferably no amount of N-methylol amide monomer units.

It also has been found that suitable adhesive properties can be achieved without crosslinking or hardening agents such as aldehyde hardeners (e.g., formaldehyde, mucochloric acid, etc.), crosslinking catalysts such as the strong base catalysts discussed by Bartman in U.S. Pat. No. 4,408,018, acid catalysts such as phosphoric or methane sulfonic acid, complexing agents such as metals and metal compounds and complexes, or reactive monomers (e.g., glycols, polyamides, etc.). Since such hardening agents increase the complexity and expense of polymer manufacture, they are not required to obtain the necessary pressure sensitive properties with the polymers of this invention, and, in many instances, the incorporation of such "hardening" agents impairs other desirable PSA properties such as tack and adhesion, the preferred polymers are substantially free of such hardening agents or their residues. Nevertheless, minor amounts of such materials can be present.

Polymer molecular weight can have a significant effect on the balance of pressure sensitive adhesive properties in polymers of a given monomer composition, i.e. polymers of identical monomer content. Thus, as discussed in the Handbook of Pressure Sensitive Adhesive Technology, for instance at pages 307-311, shear resistance is roughly proportional to molecular weight up to relatively high molecular weights at which shear resistance drops off dramatically in some polymers. Tack is typically high at very low molecular weights and decreases gradually as molecular weight is increased after a molecular weight value yielding optimum tack is exceeded. Adhesion typically exhibits discontinuous behavior, increasing with molecular weight up to moderate molecular weight levels and then gradually decreasing as molecular weight is increased further. The polymers useful in the adhesives of this invention typically have number average molecular weights of at least about 10,000, generally within the range of about 10,000 to about 1,000,000 as determined by gel permeation chromatography. Such polymers have relatively high shear values and a favorable balance of other properties including peel value and tack. Thus, the adhesives typically have shear holding values of at least about 20 minutes, typically at least about 50 minutes, and, in high shear formulations, as much as 1,000 minutes or more measured at 75° F. under 500 gram loading as described hereinafter. Peel values are generally at least about 1.5, most often at least about 1.8, and preferably at least about 2 pounds per inch width. Yet the high shear and peel values of these pressure sensitive adhesives are not achieved at the expense of significant, if any, loss of tack. Thus, the polymers generally have loop tack values of at least about 0.8. pounds per half inch width, i,e., they exhibit loop tack approximately equivalent to, and sometimes even higher than, the loop tack exhibited by otherwise identical polymers not containing the described functional monomers under otherwise identical conditions (monomer content, molecular weight, etc.) For the purposes of this disclosure, shear strength, peel adhesion, and loop tack are determined as described hereinafter in the illustrative examples unless otherwise specified.

Many of the polymers useful in this invention exhibit sufficient tack for many PSA applications without added tackifiers, although the conjugated diolefin polymers generally require tackifiers to posses tack sufficient for many applications. Illustrative of polymers which are usually employed with tackifiers are conjugated diolefin polymers and their interpolymers, such as polymers and interpolymers of isoprene, butadiene, etc. in the presence or absence of other monomers, e.g. styrene. On the other hand, the polyalkenyl ether and olefinically unsaturated carboxylic acid ester polymers, and interpolymers of olefins and alkenyl carboxylic acid esters usually exhibit sufficient tack, in the absence of tackifiers, to be useful as pressure sensitive adhesives. Nevertheless, adhesives based on such polymers also may contain compatible tackifiers to provide increased tack if desired.

The adhesives may contain very minor amounts of tackifiers to increase tack only slightly, or they may contain up to 150 weight parts or more of tackifier per 100 weight parts of one or more of the described polymers. Suitable tackifiers include rosins, hydrogenated rosins, esters of such rosins, synthetic hydrocarbon tackifiers and low molecular weight and low $T_g$ polycarboxylic acid esters. Typical rosins and hydrogenated rosin ester tackifiers have ring and ball softening temperatures of about 25° C. to about 115° C., while preferred tackifiers have softening temperatures of about 50° C. to about 110° C. Useful hydrocarbon tackifiers may be manufactured from $C_9$ aromatic monomers or from $C_5$ aliphatic monomers and mixtures of such aromatic and aliphatic monomers. Such monomers are usually derived from the so called $C_9$ and $C_5$ cuts in the fractionation of crude oil or similar material. Such synthetic hydrocarbon tackifiers generally have ring and ball softening temperatures of about 10° C. to about 100° C. The polycarboxylic acid ester tackifier resins are polymerized from one or more monomers such as acrylic acid which is substituted or unsubstituted with alkyl or alkoxyl radicals having one to four carbon atoms or with alkyl or alkanol esters of such acids in which the alkyl or alkanol moiety has from one to about six carbon atoms.

The useful polymers can be prepared by free radical solution and emulsion polymerization methods known in the art including batch, continuous and semicontinuous procedures. For the purposes of this disclosure, free radical polymerization methods are intended to include radiation polymerization techniques. Illustrative free-radical polymerization procedures suitable for preparing aqueous polymer emulsions involve gradually adding the monomer or monomers to be polymerized simultaneously to an aqueous reaction medium at rates proportionate to the respective percentage of each monomer in the finished polymer and initiating and continuing polymerization with a suitable free radical polymerization catalyst. Optionally, copolymers can be obtained by adding one or more comonomers disproportionately throughout the polymerization so that the portions of the polymers formed during the initial polymerization stage comprise a monomer composition differing from that formed during intermediate or later stages of the same polymerization. For instance, a styrene-butadiene copolymer can be formed by adding a greater proportion or all of the styrene during the initial polymerization stages with the greater proportion of the butadiene being added later in the polymerization.

Illustrative free-radical catalysts are free radical initiators such as hydrogen peroxide, potassium or ammonium peroxydisulfate, dibenzoyl peroxide, lauroyl peroxide, ditertiarybutyl peroxide, 2,2'-azobisisobutyronitrile, etc., either alone or together with one or more reducing components such as sodium bisulfite, sodium metabisulfite, glucose, ascorbic acid, erythorbic acid, etc. Ultraviolet (UV) and electron beam polymerization methods suitable for initiating free radical polymerization are discussed in the Handbook of Pressure-Sensitive Adhesive Technology, particularly at pages 586–604 and the references cited therein. The reaction is continued with agitation at a temperature sufficient to maintain an adequate reaction rate until most or all monomers are consumed. Monomer addition is usually continued until the latex reaches a polymer concentration of about 20 to about 70 weight percent.

Physical stability of the dispersion usually is achieved by providing in the aqueous reaction medium one or more nonionic, anionic, and/or amphoteric surfactants including copolymerizable surfactants such as sulfonated alkylphenol polyalkyleneoxy maleate and copolymerizable stabilizers such as sulfoethyl methacrylate, alkenyl sulfonates, etc.. Illustrative of nonionic surfactants are alkylpolyglycol ethers such as ethoxylation products of lauryl, oleyl, and stearyl alcohols or mixtures of such alcohols as coconut fatty alcohols; alkylphenol polyglycol ethers such as ethoxylation products of octyl- or nonylphenol, diisopropylphenol, triisopropylphenol, di- or tritertiarybutyl phenol, etc. Illustrative of anionic surfactants are alkali metal or ammonium salts of alkyl, aryl, or alkylaryl sulfonates, sulfates, phosphates, phosphonates, etc. Examples include sodium lauryl sulfate, sodium octylphenol glycolether sulfate, sodium dodecylbenzene sulfonate, sodium lauryldiglycol sulfate, and ammonium tritertiarybutylphenol penta- and octa-glycol sulfates. Numerous other examples of suitable ionic, nonionic and amphoteric surfactants are disclosed in U.S. Pat. Nos. 2,600,831, 2,271,622, 2,271,623, 2,275,727, 2,787,604, 2,816,920, and 2,739,891, the disclosures of which are incorporated herein by reference in their entireties.

Protective colloids may be added to the aqueous polymer dispersions either during or after the reaction period. Illustrative protective colloids include gum arabic, starch, alginates, and modified natural substances such as methyl-, ethyl-, hydroxyalkyl-, and carboxymethylcellulose, and synthetic substances such as polyvinyl alcohol, polyvinyl pyrrolidone, and mixtures of two or more of such substances. Fillers and/or extenders such as dispersible clays, and colorants, such as pigments and dyes, can also be added to the aqueous dispersions either during or after polymerization. Those skilled in the art of emulsion polymers will appreciate that protective colloids, tackifiers, and other additives should be compatible with the polymer emulsion to assure formation of a stable dispersion.

The emulsions typically contain about 20 to about 70 percent polymer as manufactured, while preferred latexes typically have solids contents of about 40 to about 60 weight percent polymer solids. The dispersed polymer particles can be of any size suitable for the intended use, although particle sizes of at least about 100 nanometers are presently preferred. Most often, the described latexes will have particle sizes within the range of about 100 to about 1000 nanometers as determined on the model N-4 or the "Nanosizer" available from Coulter Electronics, Inc., of Hialeah, Fla.

Solutions of the useful polymers can be prepared by polymerizing the selected monomers as described above in solvents in which both the monomers and the polymers are soluble. Suitable solvents include aromatic solvents such as xylene and toluene, alkanes such as hexane, and alcohols such as butanol. Polymerization initiators and reducing components, when employed, should be soluble in the selected solvent or mixture of solvents. Illustrative free radical initiators soluble in the noted organic solvents include dibenzoyl peroxide, lauroyl peroxide, and 2,2'-azobisisobutyronitrile. Erythorbic and ascorbic acids are illustrative of reducing components soluble in polar organic solvents.

Hot melt adhesives containing the described polymers can be obtained by procedures and with formulations known in the art to be suitable for the formulation of pressure sensitive adhesives of such polymers which do not contain the described functional monomers. For instance, the useful polymers can be separated from their solutions by evaporation of the solvent; and they can be separated from water based emulsions by evaporation of water, coagulation with strong acids and/or multivalent metal ions, e.g. calcium, aluminum, magnesium, etc, or by subjecting the emulsion to one or more freeze-thaw cycles. The coagulated polymer is then filtered from the aqueous phase and dried prior to compounding.

Typically, the compounded hot melt adhesives will contain about 10 to about 98 weight percent, generally about 15 to about 90 weight percent of one or more of the described polymers in the presence or absence of other polymers, tackifiers, antioxidants, waxes or oils and optional additives such as colorants and fillers. The higher polymer concentrations within these ranges generally are employed only with polymers which themselves are normally tacky, such as the homopolymers and copolymers of olefinically unsaturated carboxylic acid esters, olefin-alkenyl carboxylate copolymers, and alkenyl ether polymers. Other of the useful polymers which are not normally tacky, and which therefore require significant amounts of tackifiers, are usually employed at lower concentrations of about 10 to about 60, generally about 15 to about 50 weight percent; the remainder of the hot melt formulation comprising tackifiers in the presence or absence of other additives, e.g. antioxidants, waxes, oils, fillers, etc. The use of waxes and oils in the described adhesives usually is undesirable due to the detrimental effects such materials may have on adhesive tack. However, small amounts of such materials can be employed, usually to reduce melt viscosity. Those skilled in the art of pressure sensitive adhesives will, of course, recognize that the tackifier or tackifiers, when employed, should be compatible with the selected polymer or polymers to ensure homogenity in the final hot melt formulation.

The hot melt adhesives can be compounded by mixing the selected polymer or polymers, antioxidants and optionally fillers in a jacketed mixing kettle, such as a heavy duty mixer of the Baker-Perkins or Day mixer type, equipped with rotors and operated at temperatures of about 200° to about 350+ F., the precise temperature employed depending on the melting point of the polymers selected. After complete melting has occurred, the tackifiers are added and mixing is continued. Waxes and/or oils, when employed, are usually added toward the end of the mixing cycle after which mixing is continued until a smooth, homogeneous composition is obtained. The resulting hot melt composition can be drawn off and used immediately in hot pots, or it may be shaped or cast into any desired form for a later use.

The pressure sensitive adhesives can be applied to any backing which it is desired to adhere to another surface or article. Illustrative backings include flexible and rigid, natural and synthetic materials such as plastics, elastomers, solid metals and foils, ceramics (tiles, glass, etc.), wood, papers and cardboard, leather materials, etc. of essentially any form including films, solid articles, woven and non-woven textile materials, etc. Illustrative uses of such articles include wall coverings (paper, fabric, films, etc.), upholstery items, construction roofing and siding materials, tapes of all varieties (including those having backings comprised of woven or non-woven fabrics, paper, polymeric films, metal foils, foams, etc., including double faced tapes and so called transfer tapes), packaging, floor and wall tile and other floor and wall coverings, paneling, etc. Suitable backing and substrate materials can be of essentially any chemical composition and include metals, ceramics (including all varieties of glass), and natural and synthetic polar and non-polar materials such as polyolefins, e.g. homopolymers and interpolymers of substituted and nonsubstituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, etc. Essentially all natural materials include one or more polar functional groups. Illustrative are virgin and reclaimed cellulosic fibers such as cotton, paper, wood, coconut fiber, jute, hemp, etc., and protenaceous materials such as leather, wool, and other animal fur. Illustrative synthetic materials containing polar functional groups are polyesters, polyamides, carboxylated styrene-butadiene polymers, etc., such as Nylon-6, Nylon-66, Nylon-610, "Dacron", "Fortrel", "Kodel", "Acrilan", "Orlon", "Creslan", "Verel" and "Dynel". Illustrative of other useful polar materials are synthetic carbon, silicon, and magnesium silicate (e.g., asbestos).

The adhesive compositions may be applied to the backing by any one of a variety of conventional coating techniques such as roll coating, spray coating, curtain coating, etc. They also may be applied to the backing without modification by extrusion coating, coextrusion, hot melt coating, etc., by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds of dry adhesive per 3,000 square feet of treated surface are generally adequate. Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

The invention is further described by the following examples which are illustrative of specific modes of practicing the invention and are not intended as limiting the scope of the invention as defined by the appended claims.

TEST STANDARDS

Test samples are prepared by applying to a 1-mil mylar backing a film of adhesive latex, solution or melt which, when cured, forms a 1-mil adhesive layer. Hot melts are applied hot, drawn down to about 1-mil films and cooled. Solution polymers are applied in somewhat thicker layers and oven dried for a period sufficient to evaporate the solvent. Emulsion polymers are also applied in layers slightly thicker than 1-mil and are dried at 150° F. for 20 minutes, covered with a release liner and aged 24 hours at 73° F. and 50 percent relative humidity.

Shear strength is determined in accordance with ASTM D3654-78, PSTC-7 and is a measure of the cohesiveness (internal strength) of an adhesive. ("PSTC" designates the Pressure Sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a one-half inch by one-half inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 500 grams applied as a hanging weight from the free end of the test strip. The elapsed time required for each test strip to separate from the test panel at 73° F. is recorded as shear strength.

Peel adhesion is determined in accordance with ASTM D-3330-78, PSTC-1 and is a measure of the force required to remove a coated, flexible sheet material from a test panel at a specific angle and rate of removal. Unless otherwise specified, the values for peel adhesion reported herein are force values expressed as pounds per inch width of coated test sheet material determined at 73° F. by the following procedure. A one-inch width of the coated sheet is applied to a horizontal surface of a clean, stainless steel test plate with at least five lineal inches of the coated sheet material in firm contact with the steel plate. A hard rubber roller is used to firmly apply the strip and remove all discontinuities and entrapped air. The free end of the coated strip is then doubled back nearly touching itself so that the angle of removal of the strip from the steel plate will be 180°. The free end of the test strip (the one pulled) is attached to the adhesion tester scale (an Instron tensile tester or Harvey tensile tester). The test plate is then clamped in the jaws of the tensile testing machine capable of moving the plate away from the scale at a constant rate of 12 inches per minute. The scale reading in pounds is recorded as the tape is peeled from the steel surface.

Loop tack is a measure of the force required to remove a standard adhesive coated Mylar film loop from a standard (PSTC) stainless steel plate at 73° F. after only nominal contact of the test strip with the steel plate in the absence of significant pressure. A one-half by four-inch strip of one mil Mylar film coated with the sample adhesive is formed into a loop with the adhesive side out, and the loop is applied to a stainless steel plate until the tape loop contacts 0.5 square inch of surface area on the plate. The loop is retracted from the plate at a rate of 12 inches per minute, and loop tack is defined as the force observed when the final portion of the adhesive strip separates from the test plate. Specifically, the steel test plate is inserted in the lower jaws of an Instron tensile tester while the upper portion of the loop is clamped in the upper jaw of the tester and is moved downward toward the test plate at a rate of 12 inches per minute. When the test loop has contacted 0.5 square inch of test plate area, the direction of travel of the upper jaw of the Instron tester is reversed and set to remove the loop from the plate at a rate of 12 lineal inches per minute.

"Twenty degree hold strength to corrugated board" is a measure of combined peel and shear strength of the adhesive mounted on 1-mil Mylar film when applied under standard force to a corrugated cardboard substrate. Samples of adhesive coated Mylar are applied to a standard corrugated cardboard substrate such that a one and one-half inch length of the adhesive coated film adheres to the corrugated surface of the test substrate with the one and one-half inch edge of the sample tape aligned parallel to the corrugated flutes (ridges) of the substrate. After application of the film to the substrate in this manner, the film portion contacting the substrate is rolled down with a standard four and one-half pound rubber-covered roller one time parallel to the one and one-half inch edge of the test tape at a roller speed of 12 inches per minute. The sample is then mounted in a shear test block set at an angle of 20° to the vertical so that the "tail" of the adhesive test strip (the portion of the test tape not adhered to the corrugated substrate) is hanging down from the bottom portion of the corrugated board at an angle of 160° to the plane of the corrugated board. A 500 gram weight is then affixed by appropriate clamps to the "tail end" of the test strip so that the weight is hanging at an angle of 160° from the portion of the test strip bonded to the corrugated board. A timer is started immediately upon application of the 500 gram weight to the test strip, and hold value is reported as the number of minutes required for the weight to tear the test strip from the corrugated backing at a temperature of 73° F.

EXAMPLE 1

A water based emulsion of an acrylate polymer containing 98.5 weight percent butyl acrylate and 1.5 weight percent methacrylic acid can be prepared by free radical polymerization of the premixed monomers in the presence of water, surfactants and catalysts in an agitated reactor. The monomer premixture is formed by blending 862 grams butyl acrylate, 13 grams methacrylic acid, and 0.1 gram of chain transfer agent. The catalyst premixture can be formed by dissolving 4.0 grams of sodium persulfate in 114 grams deionized water, and the reactor is then charged with 690 grams deionized water, 20 grams of an alkylphenoxy poly(ethyleneoxy)ethanol surfactant, 2.5 grams of a sodium alkyl sulfonate surfactant, and 60 grams of the monomer premixture. This reactor charge is then heated to 90° C., 10 ml. of catalyst solution is added, and the resulting mixture is agitated for 10 minutes. Monomer premixture and catalyst solution additions are then commenced. Eight hundred ninety ml. of the monomer premixture is added over a period of 2 hours, and the total catalyst solution is added over a period of 2.5 hours. Thus, catalyst addition is continued for one-half hour after monomer addition is discontinued. After catalyst addition is discontinued, the reaction phase is maintained at 90° C. for an additional 1 hour, is then cooled to 35° C. and removed from the reactor. The pH can be adjusted to 7.5 to 8.0 with ammonium hydroxide.

EXAMPLE 2

The operation described in Example 1 can be repeated employing identical reactor feed materials and operating procedures with the exception that the monomer premixture contains 887 grams butylacrylate, 13.7 grams methacrylic acid, and 18.4 grams of acetoacetoxyethyl methacrylate (AAEMA) corresponding to a finished polymer composition of 96.5 weight percent butylacrylate, 1.5 weight percent methacrylic acid, and 2.0 weight percent AAEMA.

The polymers of Examples 1 and 2 will exhibit ambient and low temperature peel, tack, and shear values characteristic of low temperature pressure sensitive adhesives. However, the polymer of Example 2, containing 2 weight percent acetoacetoxyethyl methacrylate, will possess a substantially higher shear value than the polymer of Example 1 and room temperature tack comparable to that of the polymer of Example 1. The adhesive of Example 2 will evidence much less tendency to be gummy and therefore unmanageable, to creep, or to bleed-through adhesive backings or substrates at ambient temperatures than will the polymer of Example 1.

EXAMPLE 3

To a 2-liter reactor equipped with heating mantle, mechanical stirrer, reflux condenser, nitrogen sparge and three laboratory metering pumps are added 140 grams of distilled water, and the water is sparged with nitrogen and heated to 75° C. The nitrogen sparge is then removed and a nitrogen atmosphere is maintained over the liquid phase.

A monomer pre-emulsion is formed by blending 426 grams of 2-ethylhexyl acrylate, 162 grams methyl acrylate, 12 grams of acrylic acid, 9 grams of nonylphenoxy poly(ethyleneoxy)ethanol nonionic water-soluble surfactant, and 21 grams of octyphenoxy poly(ethyleneoxy)ethanol nonionic surfactant in 140 grams of distilled water. Five percent of this pre-emulsion is introduced to the reactor with agitation. After stirring for 3 minutes, 0.5 gram of sodium persulphate dissolved in 10 grams of distilled water is added. After a further 3 minutes, 0.5 gram of sodium metabisulfite is added, and the mixture is held at 75° C., for 20 minutes. The remainder of the monomer pre-emulsion is then added gradually over a period of 3 hours through one of the metering pumps provided. The catalyst solutions are added through the two remaining metering pumps and concurrently with monomer emulsion addition. One catalyst solution contains 1.5 grams of sodium persulphate dissolved in 75 grams of distilled water, and the other contains 1.5 grams of sodium metabisulphite dissolved in 75 grams of distilled water. These catalyst solutions are added gradually at a rate such that they are metered into the reactor over a period of 3.5 hours. Monomer addition is discontinued ½ hour before catalyst addition is discontinued, and polymerization temperature is maintained at 75° C. throughout the run. After all of the sodium persulphate and sodium metabisulphite solutions have been added, the reaction mixture is held for an additional 30 minutes at 75° C. and is then cooled to room temperature. The resulting latex is neutralized to a pH between 4 and 6.5 with either 7 percent ammonia or 10 percent sodium hydroxide in distilled water. The resulting latex is tested by the procedures described above and is found to have a peel value of 6 pounds and evidences cohesive failure, a loop tack of 1.3 pounds, and a shear value of 100 minutes. Cohesive failure is evidenced by tearing or separation of the adhesive itself, with the separated portions of the adhesive remaining adhered to their respective substrates. These results are summarized in Table 2 which follows Example 5.

EXAMPLE 4

The operation described in Example 3 is repeated with the exception that the monomer pre-emulsion contains 426 grams 2-ethylhexyl acrylate, 156 grams methyl acrylate, 12 grams acrylic acid, and 6 grams of acetoacetoxyethyl methacrylate (AAEMA). Surfactant compositions and operating procedures are as defined in Example 3.

The resulting latex is tested by the procedures described above and has a peel value 3.2 pounds per inch width (evidencing adhesive failure), a loop tack of 1.2 pounds per ½ inch width, and a shear value of 186 minutes. Although this adhesive has a peel strength lower than that obtained in Example 3, its loop tack is essentially equivalent, and its shear strength is substantially higher. These results are summarized in Table 2.

EXAMPLE 5

The operation described in Example 3 is again repeated with the exception that the monomer pre-emulsion contains 426 grams of 2-ethylhexyl acrylate, 150 grams methyl acrylate, 12 grams acrylic acid, and 12 grams AAEMA. Surfactant composition and concentration and operating conditions are otherwise as defined in Example 3.

This product is tested by the procedures described above and has a peel value of 2.6 pounds per inch width (evidencing adhesive failure), a loop tack of 1.1 pounds per ½ inch width and a shear value of 1,866 minutes. These results demonstrate an 18-fold increase in shear value over the adhesive of Example 3 with little or no loss in loop tack.

TABLE 2

| Ex. No. | MONOMERS, % | | | | PEEL | TACK | SHEAR |
|---|---|---|---|---|---|---|---|
| | 2-EHA | MA | AA | AAEMA | | | |
| 3 | 71 | 27 | 2 | 0 | 6 | 1.3 | 100 |
| 4 | 71 | 26 | 2 | 1 | 3.2 | 1.2 | 186 |
| 5 | 71 | 25 | 2 | 2 | 2.6 | 1.1 | 1,866 |

EXAMPLE 6

A latex can be prepared by the procedures described in Example 3 employing a monomer pre-emulsion containing 582 grams (97 weight percent) butyl acrylate, 18 grams (3 weight percent) acrylic acid, 0.1 weight percent of a sodium salt of sulphated nonylphenoxy poly-(ethleneoxy)ethanol surfactant, and 1.5 weight percent of the octyl phenoxy surfactant described in Example 3.

EXAMPLE 7

The operation described in Example 6 can be repeated with the exception that the monomer composition in the pre-emulsion contains 576 grams (96 weight percent) butyl acrylate, 18 grams (3 weight percent) acrylic acid, and 6 grams (1 weight percent) AAEMA with all other compositions and operating conditions remaining the same. The resulting adhesive will have significantly higher shear strength than will the adhesive of Example 6 with little or no loss of tack.

EXAMPLE 8

The operation of Example 6 can be repeated employing a monomer pre-emulsion containing 582 grams 2-ethylhexyl acrylate and 18 grams acrylic acid corresponding to a polymer composition of 97 weight percent 2-ethyl hexylacrylate and 3 weight percent arylic acid, with surfactant compositions and operating conditions otherwise remaining the same.

EXAMPLE 9

The operation described in Example 6 can be repeated with the excpetion that the monomer content of the monomer pre-emulsion corresponds to 576 grams 2-ethylhexyl acrylate, 18 grams acrylic acid and 6 grams AAEMA resulting in a polymer containing 96 weight percent 2-ethylhexyl acrylate, 3 weight percent acrylic acid, and 1 weight percent AAEMA. This polymer will have significantly higher shear than the polymer obtained in Example 8 with little or no loss in tack.

EXAMPLE 10

The operation described in Example 6 can be repeated with a monomer pre-emulsion having a monomer content of 291 grams butyl acrylate, 291 grams 2-ethylhexyl acrylate, and 18 grams acrylic acid corresponding to a polymer composition of 48.5 weight percent butylacrylate, 48.5 weight percent 2-ethylhexyl acrylate, and 3 weight percent acrylic acid.

EXAMPLE 11

The operation described in Example 6 can be repeated employing otherwise identical compositions and conditions with the exception that the monomer pre-emulsion contains 288 grams butyl acrylate, 288 grams 2-ethylhexyl acrylate, 18 grams acrylic acid, and 6 grams AAEMA corresponding to a polymer composition of 48 weight percent butyl acrylate, 48 weight percent 2-ethylhexyl acrylate, 3 weight percent acrylic acid, and 1 weight percent AAEMA. The resulting polymer will have significantly higher shear than the polymer of Example 10 with little or no loss of tack.

EXAMPLE 12

An N-methylolacrylamide-containing polymer can be obtained by the procedure described in Example 6 with the exception that the monomer pre-emulsion contains 288 grams butyl acrylate, 288 grams 2-ethylhexyl acrylate, 18 grams acrylic acid and 6 grams N-methylolacrylamide with all other operating conditions and surfactant compositions being the same as described in Example 6. The resulting polymer will contain 48 weight percent butyl acrylate, 48 weight percent 2-ethylhexyl acrylate, 3 weight percent acrylic acid, and 1 weight percent N-methylolacrylamide. This polymer will have significantly higher cohesive (shear) strength than the polymer described in Example 10 and peel and tack values substantially lower than the peel and tack values of the polymer obtained in Example 11.

EXAMPLE 13

A styrene-butadiene-acrylic acid polymer can be prepared by adding to a pressure reactor 67 weight parts water, 8.3 weight parts Polystep RA 35 S surfactant (the sodium salt of a sulfonated nonylphenol polyethyleneoxy maleate available from Stepan Chemical Company, Northfield, Ill.), 2.5 weight parts acrylic acid, 0.2 weight parts tetrapotassium pyrophosphate and 0.83 weight parts sodium hydroxide with continuous agitation. 2 weight parts dodecyl mercaptan dissolved in 30 weight parts styrene is added, and 67.5 weight parts butadiene is then introduced. Reaction is initiated by introduction of 8.3 weight parts of a 4 weight percent solution of potassium persulfate, reactor temperature is brought to 100° F., 0.002 g. sodium ferric ethylenediamine tetracetate is added, and polymerization is continued for 1 hour at 100° to 115° F. Reaction temperature is then incrementally increased over the next 6 hours to 155° F., and polymerization is continued at that temperature for an additional 24 hours. 50 weight parts of the resulting polymer latex (dry weight) is then blended with 50 weight parts (dry weight) of an aqueous emulsion of Burez Stabilized Ester 85, a pentaerythritol ester of disproportionated rosin available from Tenneco Malrose Ltd., Rockingham Works, Avonmouth, Bristol, England. The peel, shear, loop tack and corrugated hold values for this adhesive can be determined by the procedures discussed above.

EXAMPLE 14

The procedure described in Example 13 can be repeated with the exception that 2 weight parts AAEMA is added to the polymerization mixture along with the butadiene. Reaction conditions, polymer composition and tackifier blending are otherwise as described in Example 13. The peel, shear, loop tack and corrugated hold values for the product can be determined by the procedures discussed above, and it will be found to have significantly higher shear and at least comparable or higher peel, loop tack and corrugated hold values in comparison to the polymer of Example 13.

EXAMPLE 15

The operation described in Example 13 can be repeated using a monomer mixture containing 30 weight parts styrene, 69 weight parts butadiene and 1 weight part itaconic acid, with all other conditions and compositions remaining the same. The resulting latex can be blended with tackifier emulsion as described in Example 13, and strength values can be determined as described above.

EXAMPLE 16

The operation described in Example 15 can be repeated with the exception that 1 weight part AAEMA is added to the monomer mixture along with the butadiene. When evaluated by the test procedures discussed above, the adhesive of this example will exhibit significantly higher shear strength and approximately comparable or higher peel, loop tack and corrugated hold values in comparison to the adhesive of Example 15.

While particular embodiments of the invention have been described, it will be understood, of course, that the invention is not limited to these embodiments, since many obvious modifications can be made, and it is intended to include within this invention any such modifications as will fall within the scope of the appended claims.

We claim:

1. A pressure-sensitive adhesive article coated on at least a portion of one surface thereof with a normally tacky and pressure sensitive adhesive composition comprising a polymer containing at least one polymerizable functional monomer of the formula:

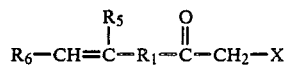

in which $R_1$ is a divalent organic radical at least 3 atoms in length, $R_5$ and $R_6$ are independently selected from hydrogen, hydroxy, halo, thio, amino or monovalent organic radicals, and X is $-CO-R_4$ or $-CN$ wherein $R_4$ is hydrogen or a monovalent organic radical, wherein said polymer is selected from the group consisting of
   (1) conjugated diolefin polymers comprising at least about 30 weight percent of one or more conjugated diene monomers having 4 to about 8 carbon atoms and 0 to about 70 weight percent of one or more alkenyl-substituted monoaromatic monomers,
   (2) olefin ester interpolymers comprising at least about 1 weight percent of a monoolefin monomer having up to about 4 carbon atoms and at least about 40 weight percent of an alkenyl or alkenol ester of a saturated carboxylic acid,
   (3) olefinically unsaturated carboxylic acid ester polymers comprising at least about 40 weight percent polymerized olefinically unsaturated carboxylic acid ester monomers,
   (4) alkenyl ether polymers comprising at least about 30 weight percent alkenyl ether monomer units, and
   (5) combinations thereof.

2. The adhesive article defined in claim 1 wherein said polymer has a $T_g$ of about 0° C. or less and comprises about 0.1 to about 40 weight percent of said functional monomer.

3. The adhesive article defined in claim 1 wherein said polymer comprises about 0.1 to about 10 weight percent of said functional monomer.

4. The adhesive article defined in claim 1 wherein said polymer comprises about 0.1 to about 10 weight percent of a member selected from the group consisting of acetoacetoxyethyl methacrylate, acetoacetoxyethyl acrylate, and combinations thereof.

5. The adhesive article defined in claim 1 wherein said polymer comprises less than about 1 weight percent of an N-methylolamide.

6. The adhesive article defined in claim 1 wherein said polymer is substantially free of N-methylolamides.

7. The adhesive article defined in claim 1 wherein said polymer comprises a polymerizable carboxylic acid monomer.

8. The adhesive article defined in claim 1 wherein said polymer further comprises at least about 0.1 weight percent of a polymerizable acid selected from the group consisting of olefinically unsaturated carboxylic acids having up to about 10 carbon atoms, sulfoalkyl esters of said olefinically unsaturated acids, and combinations thereof.

9. The article defined in claim 1 wherein said polymer comprises about 0.1 to about 5 weight percent of said functional monomer.

10. The article defined in claim 1 comprising a flexible backing and having a shear holding value of at least about 50 minutes at 75° F. and a loop tack value of at least about 0.8 pound per half inch.

11. The article defined in claim 1 wherein said polymer is substantially free of polyvalent metals, compounds and complexes.

12. The article defined in claim 1 wherein $R_1$ is a divalent organic radical 3 to about 40 atoms in length, and X is $-CO-R_4$.

13. The article defined in claim 1 wherein said polymer comprises about 0.1 to about 10 weight percent of a member selected from the group consisting of acetoacetoxyethyl methacrylate, acetoacetoxyethyl acrylate, and combinations thereof, and said adhesive composition comprises at least about 20 weight percent of said conjugated diolefin polymer containing at least about 5 weight percent of said monoaromatic monomer.

14. The article defined in claim 1 wherein said polymer further comprises at least about 0.5 weight percent of a polymerizable acid selected from the group consisting of olefinically unsaturated carboxylic acids having up to about 10 carbon atoms, sulfoalkyl esters of said olefinically unsaturated acids, and combinations thereof.

15. The adhesive article defined in claim 1 comprising (a) said conjugated diolefin polymer comprising at least about 50 weight percent of said conjugated diolefin monomer, at least about 5 weight percent of said alkenyl substituted monoaromatic monomer, about 0.1 to about 10 weight percent of said functional monomer, and a member selected from the group consisting of acrylic acid, itaconic acid, and combinations thereof, and (b) a tackifier.

16. The adhesive article defined in claim 1 wherein said adhesive composition has a shear holding value of at least about 50 minutes at 75° F.

17. The adhesive article defined in claim 1 wherein said polymer has a $T_g$ of about 0° C. or less and said composition comprises at least about 20 weight percent of said conjugated diolefin polymer comprising at least 5 weight percent of said monoaromatic monomer and at least about 0.1 weight percent of said functional monomer.

18. The article defined in claim 17 wherein said aromatic monomer comprises styrene, said conjugated diolefin comprises a member selected from the group consisting of butadiene, isoprene and combinations thereof, and said composition further comprises a tackifier.

19. The article defined in claim 17 wherein said polymer further comprises about 0.2 to about 10 weight percent of a member selected from the group consisting of acrylic acid, itaconic acid, and combinations thereof.

20. The article defined in claim 1 wherein said polymer further comprises a member selected from the group consisting of acrylic acid, itaconic acid, and combinations thereof.

21. The adhesive article defined in claim 20 having a shear holding value of at least about 500 minutes at 75° F. and a loop tack value of at least about 0.8 pound per half inch.

22. The adhesive article defined in claim 1 wherein said polymer comprises at least about 0.1 weight percent of at least one functional monomer having the formula:

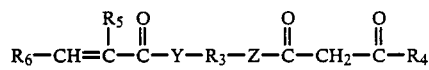

wherein $R_4$, $R_5$, and $R_6$ are as defined in claim 1, $R_3$ is a divalent organic radical, Y and Z are independently selected from the group consisting of O, S, and $NR_7$, and $R_7$ is H or monovalent organic radical.

23. The adhesive article defined in claim 22 wherein $R_4$ is hydrogen or alkyl having up to about 8 carbon atoms, $R_3$ is a divalent organic radical at least 2 atoms in length, and said composition comprises at least about 20 weight percent of said conjugated diolefin polymer containing at least 5 weight percent of said monoaromatic monomer.

24. The adhesive article defined in claim 16 wherein each of Y and Z is O.

25. The article defined in claim 1 wherein said polymer is substantially free of crosslinking agents.

26. The adhesive article defined in claim 25 having a shear holding value of at least 50 minutes at 75° F.

27. A pressure-sensitive adhesive article coated on at least a portion of one surface thereof with a normally tacky and pressure sensitive adhesive composition comprising a polymer containing pendant functional groups of the formula:

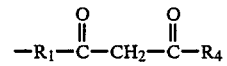

wherein $R_1$ is a divalent organic radical at least 3 atoms in length, and $R_4$ is H or a monovalent organic radical, and wherein said polymer is selected from the group consisting of:
(1) conjugated diolefin polymers comprising at least about 30 weight percent of one or more conjugated diene monomers having 4 to about 8 carbon atoms and 0 to about 70 weight percent of one or more alkenyl-substituted monoaromatic monomers,
(2) olefin ester interpolymers comprising at least about 1 weight percent of a monoolefin monomer having up to about 4 carbon atoms and at least about 40 weight percent of an alkenyl or alkenol ester of a saturated carboxylic acid,
(3) olefinically unsaturated carboxylic acid ester polymers comprising at least about 40 weight percent polymerized olefinically unsaturated carboxylic acid ester monomers,
(4) alkenyl ether polymers comprising at least about 30 weight percent alkenyl ether monomer units, and
(5) combinations thereof.

28. The adhesive article defined in claim 27 wherein said polymer is substantially free of crosslinking agents and residues thereof.

29. The adhesive article defined in claim 27 wherein $R_1$ is an ethylene radical, $R_4$ is a methyl radical, and said polymer comprises about 0.1 to about 10 weight percent of said functional monomer.

30. The adhesive article defined in claim 27 wherein said polymer further comprises at least about 0.1 weight percent of a polymerizable, olefinically unsaturated carboxylic acid monomer.

31. The adhesive article defined in claim 27 wherein said polymer comprises at least about 0.1 weight percent of said pendant functional groups.

32. The adhesive article defined in claim 31 having a sheer holding value of at least about 1,000 minutes at 75° F.

33. The adhesive article defined in claim 27 wherein $R_1$ is of the formula:

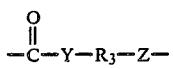

wherein Y and Z are independently selected from the group consisting of oxygen, sulfur, and $NR_7$, $R_3$ is a divalent organic radical at least about 2 atoms in length, and $R_7$ is H or hydrocarbyl.

34. The adhesive article defined in claim 33 wherein $R_3$ is selected from the group consisting of substituted and unsubstituted alkylene, alkylene-oxy, alkyleneimine and alkylene-thio radicals.

35. A pressure-sensitive adhesive article coated on at least a portion of one surface thereof with a normally tacky and pressure sensitive adhesive composition comprising a polymer which contains at least about 0.1 weight percent pendant functional groups of the formula:

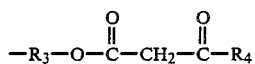

wherein $R_3$ is a divalent organic radical at least 2 atoms in length, and $R_4$ is hydrogen or an organic radical, and wherein said polymer is selected from the group consisting of
  (1) conjugated diolefin polymers comprising at least about 30 weight percent of one or more conjugated diene monomers having 4 to about 8 carbon atoms and 0 to about 70 weight percent of one or more alkenyl-substituted monoaromatic monomers,
  (2) olefin ester interpolymers comprising at least about 1 weight percent of a monoolefin monomer having up to about 4 carbon atoms and at least about 40 weight percent of an alkenyl or alkenol ester of a saturated carboxylic acid,
  (3) olefinically unsaturated carboxylic acid ester polymers comprising at least about 40 weight percent polymerized olefinically unsaturated carboxylic acid ester monomers,
  (4) alkenyl ether polymers comprising at least about 30 weight percent alkenyl ether monomer units, and
  (5) combinations thereof.

36. The adhesive article defined in claim 35 wherein said polymer comprises at least about 0.1 weight percent of a polymerizable, olefinically unsaturated carboxylic acid monomer and has a Tg of about 0° C. or less.

37. A pressure-sensitive adhesive article coated on at least a portion of one surface thereof with a normally tacky and pressure sensitive adhesive composition comprising a polymer containing pendant functional groups attached to the polymer backbone having the formula:

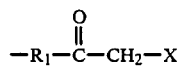

in which $R_1$ is a divalent organic radical at least 3 atoms in length, and X is $-CO-R_4$ or $-CN$ wherein $R_4$ is hydrogen or a monovalent organic radical, and wherein said polymer is selected from the group consisting of
  (1) conjugated diolefin polymers comprising at least about 30 weight percent of one or more conjugated diene monomers having 4 to about 8 carbon atoms and 0 to about 70 weight percent of one or more alkenyl-substituted monoaromatic monomers,
  (2) olefin ester interpolymers comprising at least about 1 weight percent of a monoolefin monomer having up to about 4 carbon atoms and at least about 40 weight percent of an alkenyl or alkenol ester of a saturated carboxylic acid,
  (3) olefinically unsaturated carboxylic acid ester polymers comprising at least about 40 weight percent polymerized olefinically unsaturated carboxylic acid ester monomers,
  (4) alkenyl ether polymers comprising at least about 30 weight percent alkenyl ether monomer units, and
  (5) combinations thereof.

* * * * *

UNITED STATES PATENT AND TRADEMARK OFFICE
CERTIFICATE OF CORRECTION

PATENT NO. : 4,759,983

DATED : 07/26/88

INVENTOR(S) : Knutson et al.

It is certified that error appears in the above-identified patent and that said Letters Patent is hereby corrected as shown below:

In Column 22, claim 24, line 19, "16" should read --23--.

On page 1, column 1, under "References Cited", U.S. Patent No. 4,421,887 should read --4,421,889--.

Signed and Sealed this

Fifth Day of September, 1989

Attest:

DONALD J. QUIGG

*Attesting Officer*   *Commissioner of Patents and Trademarks*